United States Patent
Heller et al.

(10) Patent No.: US 7,981,961 B2
(45) Date of Patent: Jul. 19, 2011

(54) COLLOIDAL AQUEOUS ORGANOPOLYSILOXANE DISPERSIONS WHICH CONTAIN BINDERS AND THE USE THEREOF

(75) Inventors: Anton Heller, Simbach (DE); Abdulmajid Hashemzadeh, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 12/921,903

(22) PCT Filed: Mar. 3, 2009

(86) PCT No.: PCT/EP2009/052480
§ 371 (c)(1),
(2), (4) Date: Sep. 10, 2010

(87) PCT Pub. No.: WO2009/112394
PCT Pub. Date: Sep. 17, 2009

(65) Prior Publication Data
US 2011/0009553 A1    Jan. 13, 2011

(30) Foreign Application Priority Data

Mar. 10, 2008 (DE) .......... 10 2008 000 585

(51) Int. Cl.
*C08L 29/05* (2006.01)

(52) U.S. Cl. .......... 524/503; 524/506; 428/447

(58) Field of Classification Search .......... 524/503, 524/506; 428/447
See application file for complete search history.

(56) References Cited

U.S. PATENT DOCUMENTS

| 3,433,780 A | 3/1969 | Cekada |
| 3,493,424 A | 2/1970 | Mohrlok |
| 4,351,736 A | 9/1982 | Steinberger |
| 4,857,582 A | 8/1989 | Wolfgruber |
| 5,281,657 A | 1/1994 | Mautner et al. |
| 6,225,403 B1 | 5/2001 | Knowlton |
| 6,399,688 B1 | 6/2002 | Iida |
| 7,459,213 B2 * | 12/2008 | Yamamoto et al. .......... 428/447 |
| 2003/0099844 A1 | 5/2003 | Hanahata |
| 2004/0014857 A1 | 1/2004 | Bacher |
| 2006/0074187 A1 | 4/2006 | Stark |
| 2007/0004859 A1 | 1/2007 | Bacher |
| 2008/0281035 A1 | 11/2008 | Hashemzadeh |

FOREIGN PATENT DOCUMENTS

| CA | 1324855 C | 11/1993 |
| DE | 1594985 A | 8/1969 |
| DE | 3004824 A1 | 8/1981 |
| DE | 3717075 A1 | 12/1988 |
| DE | 102005054913 A1 | 5/2007 |
| EP | 0076490 A1 | 4/1983 |
| EP | 0492377 A2 | 7/1992 |
| EP | 1382621 A1 | 1/2004 |
| JP | 2001172545 A | 6/2001 |
| WO | 2004065437 A1 | 8/2004 |
| WO | 2004104093 A1 | 12/2004 |

OTHER PUBLICATIONS

Xin Jia et al., Eurpoean Polymer Journal 43 (2007). pp. 1123-1131.

* cited by examiner

*Primary Examiner* — Robert D. Harlan
(74) *Attorney, Agent, or Firm* — Brooks Kushman P.C.

(57) ABSTRACT

Binder-containing aqueous dispersions containing organopolysiloxanes $R^1_x Si(OR^2)_y O_{(4-x-y)/2}$ where x+y is $\leq 3$, x averages 1.0 to 2.0 and y averages 0 to 0.5, and a water soluble or self-dispersing silane-containing polymer provides both high adhesion as well as soil-repellant properties when applied to substrates such as textiles and carpeting.

17 Claims, No Drawings

COLLOIDAL AQUEOUS ORGANOPOLYSILOXANE DISPERSIONS WHICH CONTAIN BINDERS AND THE USE THEREOF

CROSS-REFERENCE TO RELATED APPLICATION

This application is the U.S. national phase of PCT Appln. No. PCT/EP2009/052480 filed Mar. 3, 2009 which claims priority to German application DE 10 2008 000 585.1 filed Mar. 10, 2008.

BACKGROUND OF THE INVENTION

1. Field of the Invention

This invention relates to binder-containing colloidal aqueous organopolysiloxane dispersions and their use for treating fiber-type and sheet-type substrates, more particularly fiber-type substrates of natural and/or synthetic origin, and in particular, textile floor coverings such as carpets and carpet flooring.

2. Description of the Related Art

Organopolysiloxane hydrosols are well known and processes for making them are described for example in U.S. Pat. Nos. 3,433,780, 4,857,582 (corresponding to DE 37 17 075 A1) and U.S. Pat. No. 5,281,657 (corresponding to EP 492 377 A2).

Similarly, uses of organopolysiloxane hydrosols as impregnating and coating agents are known. DE 1 594 985 A claims the use for treating natural and synthetic fiber materials. It is specifically stated that carpet products exhibit improved dry soil repellency following impregnation with colloidal suspensions of organosilsesquioxanes.

DE 30 04 824 A1 selects colloidal suspensions of organosilsesquioxanes in conjunction with silica hydrosols for pile stabilization of textile materials. However, films of organosilsesquioxanes prove to be hard and brittle; i.e., coatings of organosilsesquioxanes on flexibly bendable and wrinkable substrates tend to be frangible and are easily detachable in particulate form by mechanical stress.

For this reason, organopolysilsesquioxanes are generally used together with binder materials. For reasons of water- and oil-repellent properties, binders in the textile sector usually comprise fluorocarbon-containing systems. U.S. Pat. No. 6,225,403 relates to a composition and method for treating textile substrates to impart oil, water and soil repellency. To this end, less than 1% of fluorocarbon resins are used together with, for example, up to 10% of organosilisesquioxane copolymer particles in the form of a hydrosol. Such mixing ratios are unlikely to provide sufficient adherence to the substrate. Frequently there is a desire nowadays, born out of the environmental debate and the possible persistence of fluorocarbon in the human body, for binder systems containing no perfluorocarbons.

Fluorocarbon-free binder systems for organosilsesquioxanes are likewise repeatedly found in the patent literature.

For instance, US 2003/0099844 A1 describes a coating composition for producing an insulating film, comprising alkoxysilanes and/or their hydrolyzates, an organic polymer, water, alcohol and optionally an organic solubilizer. The organic polymer may be inter alia a polyvinyl alcohol or polyvinyl ester. Polyvinyl alcohol used as a protective colloid for stabilizing organopolysiloxane hydrosols is also mentioned in the above-cited U.S. Pat. No. 5,281,657 (corresponding to EP 492 377 A2).

In "Preparation and properties of poly(vinyl alcohol)/silica nanocomposites derived from copolymerization of vinyl silica nanoparticles and vinyl acetate", Xin Jia et al., European Polymer Journal 43 (2007), pages 1123-1131, preparation of nanocomposites is described. The synthesis proceeds via the route of a free-radical in situ copolymerization of vinyl-containing silicas with vinyl acetate. Subsequent saponification gives rise to filmable polyvinyl alcohols which, owing to their content of covalently bonded silicone particles, have improved mechanical and thermal stabilities. The proportion of silica particles in the nanocomposites is up to max. 4% by weight. Soil-repellent properties are unlikely for a coating with such materials.

Silane-containing organic polymers are also known from the literature. Usually, they are produced via the free-radical copolymerization of olefinic organic monomer with olefinically functionalized silanes. Especially vinyl acetate or vinyl alcohol copolymers are obtainable in this way. Examples thereof are found in EP 76 490 A1, US 2004/0014857 A (corresponding to EP 1 382 621 A1) and DE 10 2005 054 913 A1.

Coatings with silane-containing vinyl acetate or vinyl alcohol copolymers exhibit good film quality and substrate adherence, but no soil-repellent properties of the kind known from coatings of organopolysiloxane hydrosols.

Yet combining organopolysiloxane hydrosols with suitable fluorocarbon-free organic binders in order to achieve good soil-repellent effects on fibrous substrates coupled with good film quality is problematic. This is because in practice it is found that only few organic binder formulations are compatible with organopolysiloxane hydrosols, i.e., do not lead to gelling with organopolysiloxane hydrosols. Good film quality and adherence of the organopolysiloxane hydrosol then requires the addition of so much binder that no or substantially impaired soil-repellent effects are to be seen.

SUMMARY OF THE INVENTION

It is an object of the present invention to provide a stable, fluorocarbon-free and film-forming composition based on colloidal aqueous organopolysiloxane dispersions that provides good adherence to fibrous or sheet-type substrates, more particularly to textile floor coverings, such as carpets and carpet flooring, and at the same time the soil repellency due to the organopolysiloxane component is preserved in substantially unchanged form. These and other objects are achieved by the invention, in which a colloidal aqueous dispersion containing specific organopolysiloxanes and water soluble or self-dispersing silane-containing polyvinyl alcohols having 50 mol percent or more of fully or partially saponified vinyl ester units.

DETAILED DESCRIPTION OF THE PREFERRED EMBODIMENTS

The subject invention thus pertains to binder-containing colloidal aqueous dispersions (B) containing
(a) organopolysiloxanes composed of units of the general formula $$R^1_x Si(OR^2)_y O_{(4-x-y)/2} \tag{I}$$

where x is 0, 1, 2 or 3 and y is 0, 1 or 2,
with the proviso that the sum total x+y is ≦3,
R$^1$ in each occurrence is the same or different and represents an SiC-bonded monovalent hydrocarbyl radical having 1 to 18 carbon atoms per radical, which may optionally include water-inert substituents, R² in each occurrence may be the same or different and represents a hydrogen atom or a hydrocarbyl radical having 1 to 18 carbon atoms per radical which may be interrupted by one or more mutually separated oxygen atoms, or a radical of the formula —COCH₃, —COC₂H₅ or —CH₂CH₂OH, (b) water-soluble or self-dispersing silane-containing polyvinyl alcohols and/or polyvinyl esters and/or copolymers with the proviso that more than 50 mol % of fully or partially saponified vinyl ester units are present, wherein at least one of the monomer units contains an attached silane, (c) optionally surface-active compounds, such as emulsifiers, and (d) water.

The colloidal aqueous dispersions (B) according to the invention may optionally contain (e) further water-miscible additives.

Preferably, the binder-containing colloidal aqueous dispersions (B) preferably contain the components (a) to (e) in amounts of 100 parts by weight of component (a), 0.1 to 70 parts by weight, preferably 0.5 to 40 parts by weight, more preferably 1.0 to 20 parts by weight, of component (b), 0 to 70 parts by weight, preferably 0.1 to 70 parts by weight, more preferably 1.0 to 20 parts by weight, of component (c), 50 to 10,000 parts by weight, preferably 100 to 3000 parts by weight, of component (d) and optionally 0 to 20 parts by weight, preferably 0.0001 to 20 parts by weight, of component (e).

The invention further provides a process for preparing binder-containing colloidal aqueous dispersions (B) by mixing aqueous colloidal organopolysiloxane dispersions (A) containing (a) organopolysiloxanes composed of units of the formula (I), (c) optionally surface-active compounds, such as emulsifiers, and (d) water, with (b) water-soluble or self-dispersing silane-containing polyvinyl alcohols and/or polyvinyl acetates and/or copolymers thereof with the proviso that more than 50 mol % of fully or partially saponified vinyl ester units are present, wherein at least one of the monomer units contains an attached silane.

The invention further provides a process for treating fiber-type and sheet-type substrates, preferably fiber-type substrates of natural and/or synthetic origin, more preferably textile floor coverings, more preferably carpets and carpet flooring, with binder-containing colloidal aqueous dispersions (B) containing (a) organopolysiloxanes composed of units of the general formula $$R^1_x Si(OR^2)_y O_{(4-x-y)/2} \quad (I)$$

where x is 0, 1, 2 or 3 and y is 0, 1 or 2, with the proviso that the sum total x+y is ≦3, R¹ in each occurrence is the same or different and represents an SiC-bonded monovalent hydrocarbyl radical having 1 to 18 carbon atoms per radical, which may optionally include water-inert substituents, R² in each occurence may be the same or different and represents a hydrogen atom or a hydrocarbyl radical having 1 to 18 carbon atoms per radical which may be interrupted by one or more mutually separated oxygen atoms, or a radical of the formula —COCH₃, —COC₂H₅ or —CH₂CH₂OH, (b) water-soluble or self-dispersing silane-containing polyvinyl alcohols and/or polyvinyl esters and/or copolymers with the proviso that more than 50 mol % of fully or partially saponified vinyl ester units are present, wherein at least one of the monomer units contains an attached silane, (c) optionally surface-active compounds, such as emulsifiers, and (d) water.

Examples of hydrocarbyl radicals R¹ are alkyl radicals such as methyl, ethyl, n-propyl, isopropyl, n-butyl, sec-butyl, amyl, hexyl, β-ethylhexyl and heptyl; alkenyl radicals such as vinyl, allyl and butenyl; alkynyl radicals; cycloalkyl radicals such as cyclobutyl, cyclohexyl and methylcyclohexyl; aryl radicals such as phenyl; alkaryl radicals such as tolyl; and aralkyl radicals such as benzyl. Particular preference is given to methyl, vinyl and phenyl radicals.

Examples of substituted hydrocarbyl radicals R¹ are halogenated hydrocarbyl radicals such as chloromethyl, 3-chloropropyl, 3-bromopropyl, 3,3,3-trifluoropropyl and 5,5,5,4,4,3,3-heptafluoropentyl, and also chlorophenyl, dichlorophenyl and trifluorotolyl; mercaptoalkyl radicals such as 2-mercaptoethyl and 3-mercaptopropyl; cyanoalkyl radicals such as 2-cyanoethyl and 3-cyanopropyl; aminoalkyl radicals such as 3-aminopropyl, N-(2-aminoethyl)-3-aminopropyl and N-(2-aminoethyl)-3-amino(2-methyl)propyl; aminoaryl radicals, such as aminophenyl; acyloxyalkyl radicals such as 3-acryloyloxypropyl and 3-methacryloyloxypropyl; hydroxyalkyl radicals such as hydroxypropyl; and radicals of the formulae

HOCH₂CH(OH)CH₂SCH₂CH₂—,

HOCH₂CH₂OCH₂— and

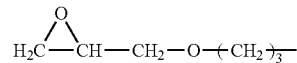

Preferably, R² is a hydrogen atom or identical or different alkyl or alkoxyalkylene radicals having 1 to 4 carbon atoms per radical. Examples of hydrocarbyl radicals R² are alkyl radicals such as methyl, ethyl, n-propyl, isopropyl, n-butyl, sec-butyl and tert-butyl; and alkoxyalkylene radicals such as methoxyethylene and ethoxyethylene. Methyl and ethyl are particularly preferred radicals R².

Preferably, in formula (I), x is on average from 1.0 to 2.0 and y is on average from 0 to 0.5.

Processes for preparing the colloidal aqueous organopolysiloxane dispersions (A) are known to a person skilled in the art and are described in U.S. Pat. Nos. 3,433,780, 4,857,582 (corresponding to DE 37 17 075 A1) and U.S. Pat. No. 5,281,657 (corresponding to EP 492 377 A2) (incorporated by reference).

Colloidal aqueous organopolysiloxane dispersions (A) are obtained for example when organosilicon compounds, such as silanes of the formula R¹ₓSi(OR²)₄₋ₓ (where x, R¹ and R² are each as defined above) and/or their partial hydrolyzates, and optionally oligomeric organopolysiloxanes are mixed with water in the presence of surface-active compounds to form a dispersion.

Processes for preparing the silane-containing polyvinyl alcohols (b) used are known to the person skilled in the art and are described in US 2004/0014857 A (corresponding to EP 1 382 621 A1) and DE 10 2005 054 913 A1 (incorporated by reference).

The silane-containing polyvinyl alcohols (b) based on partially or fully saponified vinyl ester copolymers are obtainable for example by free-radical polymerization of vinyl esters with ethylenically unsaturated silane-containing monomers and optionally further copolymerizable comonomers and saponification of the resulting polymers. Silane-containing polyvinyl alcohols (b) are also obtainable for example by free-radical graft polymerization of vinyl alcohol polymers with ethylenically unsaturated silane-containing monomers.

Suitable silane-containing polyvinyl alcohols (b) are fully saponified or partially saponified vinyl ester polymers having a degree of hydrolysis in the range from 75 to 100 mol % and a fraction of silane-containing comonomer units ranging from 0.01 to 10 mol %. Fully saponified vinyl ester polymers have a degree of hydrolysis of preferably 97.5 to 100 mol % and more preferably 98 to 99.5 mol %. Partially saponified polyvinyl esters have a degree of hydrolysis of preferably 80 to 95 mol % and more preferably 86 to 90 mol %. The Höppler viscosity (to DIN 53015 as 4% by weight aqueous solution) is used as a measure of molecular weight and of the degree of polymerization of the partially or fully saponified, silanized vinyl ester polymers, and is preferably in the range from 2 to 50 mPa·s at 25° C.

Suitable vinyl esters are vinyl esters of branched or unbranched carboxylic acids having 1 to 18 carbon atoms. Preferred vinyl esters are vinyl acetate, vinyl propionate, vinyl butyrate, vinyl 2-ethylhexanoate, vinyl laurate, vinyl pivalate and vinyl esters of alpha-branched monocarboxylic acids having 5 to 13 carbon atoms, preferably VeoVa9® or VeoVa10® (trade names of Shell). Vinyl acetate is particularly preferred.

Preferred 1-alkylvinyl esters having alkyl radicals of 1 to 6 carbon atoms and of carboxylic acids having 1 to 6 carbon atoms are 1-methylvinyl acetate, 1-ethylvinyl acetate and also 1-propylvinyl acetate.

The vinyl ester units may optionally be copolymerized with one or more monomers from the group consisting of methacrylic esters and acrylic esters of alcohols having 1 to 15 carbon atoms, olefins, dienes, vinyl aromatics and vinyl halides. Suitable monomers from the group of esters of acrylic acid or of methacrylic acid are esters of branched or unbranched alcohols having 1 to 15 carbon atoms. Preferred methacrylic esters or acrylic esters are methyl acrylate, methyl methacrylate, ethyl acrylate, ethyl methacrylate, propyl acrylate, propyl methacryate, n-butyl acrylate, isobutyl acrylate, t-butyl acrylate, n-butyl methacrylate, isobutyl methacrylate, t-butyl methacrylate, 2-ethylhexyl acrylate, norbornyl acrylate. Particular preference is given to methyl acrylate, methyl methacrylate, n-butyl acrylate, isobutyl acrylate, t-butylacrylate, 2-ethylhexyl acrylate and norbornyl acrylate. Suitable dienes are 1,3-butadiene and isoprene. Examples of polymerizable olefins are ethene and propene. Useful vinyl aromatics are styrene and vinyltoluene. Useful vinyl halides are typically vinyl chloride, vinylidene chloride or vinyl fluoride, preferably vinyl chloride. The fraction of these comonomers is determined such that the fraction of vinyl ester monomer in the vinyl ester polymer is >50 mol %.

If desired, still further comonomers can be present in a fraction of preferably 0.1 to 25 mol %. Examples thereof are ethylenically unsaturated mono- and dicarboxylic acids, preferably acrylic acid, methacrylic acid, fumaric acid and maleic acid; ethylenically unsaturated carboxylic amides and nitriles, preferably N-vinylformamide, acrylamide and acrylonitrile; mono- and diesters of fumaric acid and maleic acid such as the diethyl and diisopropyl esters and also maleic anhydride, ethylenically unsaturated sulfonic acids or their salts, preferably vinyl sulfonic acid, 2-acrylamido-2-methyl-propanesulfonic acid. Further examples are precrosslinking comonomers such as polyethylenically unsaturated comonomers, examples being divinyl adipate, diallyl maleate, allyl methacrylate, butanediol diacrylate or triallyl cyanurate, or postcrosslinking comonomers, examples being acrylamidoglycolic acid (AGA), methyl methylacrylamidoglycolate (MAGME), N-methylolacrylamide (NMA), N-methylolmethacrylamide, N-methylolallyl carbamate, alkyl ethers such as the isobutoxy ether or ester of N-methylolacrylamide, of N-methylol-methacrylamide and of N-methylolallyl carbamate.

Suitable ethylenically unsaturated silane-containing monomers are for example ethylenically unsaturated silicon compounds of the general formula

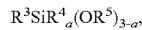

where a is 0, 1 or 2, $R^3$ is $CH_2=CR^6-(CH_2)_{0-3}-$ or $CH_2=CR^6CO_2(CH_2)_{1-3}-$, $R^4$ is $C_1$- to $C_3$-alkyl, $C_1$- to $C_3$-alkoxy or halogen, preferably Cl or Br, $R^5$ is a branched or unbranched, optionally substituted alkyl radical having 1 to 12 carbon atoms, preferably 1 to 3 carbon atoms, or is an acyl radical having 2 to 12 carbon atoms, in which case $R^5$ may optionally be interrupted by an ether group, and $R^6$ is H or $CH_3$.

Suitable ethylenically unsaturated silane-containing monomers also include (meth)acrylamides containing silane groups, of the general formula

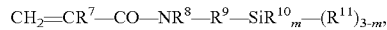

where m is 0 to 2, $R^7$ is either H or methyl, $R^8$ is H or an alkyl group having 1 to 5 carbon atoms, $R^9$ is an alkylene group having 1 to 5 carbon atoms or a bivalent organic group in which the carbon chain is interrupted by an oxygen or a nitrogen atom, $R^{10}$ is an alkyl group having 1 to 5 carbon atoms, $R^{11}$ is an alkoxy group having 1 to 40 carbon atoms, which may be substituted with further heterocycles. In monomers where 2 or more $R^7$ or $R^{11}$ groups occur, these can be identical or different. Examples of such (meth)acrylamidoalkylsilanes are:

3-(meth)acrylamidopropyltrimethoxysilanes, 3-(meth)acrylamidopropyltriethoxysilanes, 3-(meth)acrylamidopropyltri(betamethoxyethoxy)silanes, 2-(meth)acrylamido-2-methylpropyltrimethoxysilanes, 2-(meth)acrylamido-2-methylethyltrimethoxysilanes, N-(2-(meth)acrylamidoethyl)aminopropyltrimethoxysilanes, 3-(meth)acrylamidopropyltriacetoxysilanes, 2-(meth)acrylamidoethyltrimethoxysilanes, 1-(meth)acrylamidomethyltrimethoxysilanes, 3-(meth)acrylamidopropylmethyldimethoxysilanes, 3-(meth)acrylamidopropyldimethylmethoxysilanes, 3-(N-methyl(meth)acrylamido)propyltrimethoxysilanes, 3-((meth)acrylamidomethoxy)-3-hydroxypropyltrimethoxysilanes, 3-((meth)acrylamidomethoxy)propyltrimethoxysilanes, N,N-dimethyl-N-trimethoxysilylpropyl-3-(meth)acrylamidopropylammonium chloride and N,N-dimethyl-N-trimethoxysilylpropyl-2-(meth)acrylamido-2-methylpropylammonium chloride.

Preferred ethylenically unsaturated silane-containing monomers are gamma-acryloyl- or gamma-methacryloyloxypropyltri(alkoxy)silanes, alpha-methacryloyloxymethyltri(alkoxy)silanes, gamma-methacryloyloxypropylmethyldi(alkoxy)silanes; vinylsilanes such as vinylalkyldi(alkoxy)silanes and vinyltri(alkoxy)silanes, where alkoxy may be for example methoxy, ethoxy, methoxyethylene, ethoxyethylene, methoxypropylene glycol ether or ethoxypropylene glycol ether radicals. Examples of preferred silane-containing monomers are 3-methacryloyloxypropyltrimethoxysilane, 3-methacryloyloxypropylmethyldimethoxysilane; vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy)isopropoxysilane, vinyltributoxysilane, vinyltriacetoxysilane, methacryloyloxymethyltrimethoxysilane, 3-methacryloyloxypropyltris(2-methoxyethoxy)silane, vinyltrichlorosilane, vinylmethyldichlorosilane, vinyltris(2-methoxyethoxy)silane, trisacetoxyvinylsilane, allylvinyltrimethoxysilane, allyltriacetoxysilane, vinyldimethylmethoxysilane, vinyldimethylethoxysilane, vinylmethyldiacetoxysilane, vinyldimethylacetoxysilane, vinylisobutyldimethoxysilane, vinyltriisopropyloxysilane, vinyltributoxysilane, vinyltrihexyloxysilane, vinylmethoxydihexoxysilane, vinyltrioctyloxysilane, vinyldimethoxyoctyloxysilane, vinylmethoxydioctyloxysilane, vinylmethoxydilauryloxysilane, vinyldimethoxylauryloxysilane and also polyethylene glycol-modified vinylsilanes.

The most preferred silanes are vinyltrimethoxysilane, vinylmethyldimethoxysilane, vinyltriethoxysilane, vinylmethyldiethoxysilane, vinyltris(1-methoxy)isopropoxysilane; methacryloyloxypropyltris(2-methoxyethoxy)silane, 3-methacryloyloxypropyltrimethoxysilane, 3-methacryloyloxypropylmethyldimethoxysilane and methacryloyloxymethyltrimethoxysilane and also mixtures thereof.

The preparation of the dispersions (B) according to the present invention optionally utilizes surface-active compounds (c) which are emulsifiers such as carboxylic acids having 9 to 20 carbon atoms; aliphatically substituted benzenesulfonic acids having at least 6 carbon atoms in the aliphatic substituents; aliphatically substituted naphthalenesulfonic acids having at least 4 carbon atoms in the aliphatic substituents; aliphatic sulfonic acids having at least 6 carbon atoms in the aliphatic substituents; silylalkylsulfonic acids having at least 6 carbon atoms in the alkyl substituents; aliphatically substituted diphenyl ether sulfonic acids having at least 6 carbon atoms in the aliphatic substituents; alkyl hydrogensulfates having at least 6 carbon atoms in the alkyl substituents; alkyl and alkarylether sulfates having at least 6 carbon atoms in the hydrophobic radical and from 1 to 40 ethylene oxide (EO) and/or propylene oxide (PO) units; taurides; esters and monoesters of sulfosuccinic acid with monohydric alcohols or alkylphenols having 4 to 15 carbon atoms, optionally ethoxylated with from 1 to 40 EO units; and also alkali metal and ammonium salts of the acids mentioned; phosphoric partial esters and their alkali metal and ammonium salts, particularly alkyl and alkaryl phosphates having 8 to 20 carbon atoms in the organic radical; alkyl ether and alkaryl ether phosphates having 8 to 20 carbon atoms in the alkyl radical and alkaryl radical respectively and from 1 to 40 EO units; salts of primary, secondary and tertiary fatty amines having 8 to 24 carbon atoms with acetic acid, sulfuric acid, hydrochloric acid and phosphoric acids; quaternary alkyl- and alkylbenzeneammonium salts, more particularly those whose alkyl groups have from 6 to 24 carbon atoms, more particularly the halides, sulfates, phosphates and acetates; quaternary ammonium hydroxides; alkylpyridinium, alkylimidazolinium and alkyloxazolinium salts, more particularly those whose alkyl chain has up to 18 carbon atoms, specifically the halides, sulfates, phosphates and acetates; alkyl polyglycol ethers, preferably those having from 3 to 40 EO units and alkyl radicals of 8 to 20 carbon atoms, alkylaryl polyglycol ethers, preferably those having from 5 to 40 EO units and from 8 to 20 carbon atoms in the alkyl and aryl radicals; ethylene oxide-propylene oxide (EO-PO) block copolymers, preferably those having from 8 to 40 EO and/or PO units; addition products of alkylamines having alkyl radicals of 8 to 22 carbon atoms with ethylene oxide or propylene oxide; alkylpolyglycosides of the general formula R*—O—$Z_o$, where R* is a linear or branched, saturated or unsaturated alkyl radical having on average 8-24 carbon atoms and $Z_o$ is an oligoglycoside radical having on average o=1–10 hexose or pentose units or mixtures thereof; natural substances and derivatives thereof, such as lecithin, lanolin, saponines, cellulose; cellulose alkyl ethers and carboxyalkylcelluloses, the alkyl groups of which each have up to 4 carbon atoms; linear organo(poly)siloxanes containing polar groups containing more particularly the elements O, N, C, S, P, more particularly those organo(poly)siloxanes having alkoxy groups having up to 24 carbon atoms and/or up to 40 ethylene oxide (EO) and/or propylene oxide (PO) groups; amino acids substituted with long-chain substituents, such as N-alkyldi(aminoethyl)glycine or N-alkyl-2-aminopropionic acid salts; betaines, such as N-(3-acylamidopropyl)-N,N-dimethylammonium salts having a $C_8$-$C_{18}$ acyl radical and alkylimidazolium betaines.

Cationic or anionic emulsifiers are preferred for use as surface-active compounds.

All the acids mentioned can be used as such or, if desired, in admixture with their salts.

When anionic emulsifiers are used, it is advantageous to use anionic emulsifiers whose aliphatic substituents contain at least 8 and more particularly 12 carbon atoms. Specific examples of aliphatic substituents are octyl, decyl, dodecyl, cetyl, stearyl, myricyl, oleyl, nonenyl, octynyl, phythyl and pentadecadienyl. Aliphatically substituted benzenesulfonic acids are preferred for use as anionic emulsifiers.

When cationic emulsifiers are used, it is advantageous to use halides and more particularly chlorides and bromides.

The amount of emulsifier used in preparing the colloidal aqueous organopolysiloxane dispersions (A) can be very small. The emulsifier is preferably used in amounts of from 0.1 to 70.0 weight percent, more preferably in amounts of 1.0% to 20.0% by weight, all based on the weight of the organosilicon compounds used in the preparation of the colloidal aqueous organopolysiloxane dispersions (A).

To prepare the colloidal aqueous organopolysiloxane dispersions (A), the emulsifier can be added not only together with the water but also together with the organosilicon compounds.

However, there are many applications where emulsifiers which can be washed off or are capable of diffusion and accumulate at boundary layers can have a disruptive effect. Therefore, instead of the emulsifiers mentioned above, it can be more advantageous to use addition salts of acetic acid onto 3-aminopropyltrimethoxysilane or 3-aminopropyltriethoxysilane, particularly advantageously addition salts of acetic acid onto N-(2-aminoethyl)-3-aminopropyltrimethoxysilane or N-(2-aminoethyl)-3-aminopropyltriethoxysilane, which are preferably hydrolyzed and condensed together with the organosilicon compounds used and in the process become co-incorporated in the organopolysiloxane scaffold.

Examples of water-miscible additives (e), which can be present in the colloidal aqueous dispersions (B) of the invention, are acids, for example formic acid, acetic acid, propionic acid, phosphoric acid, hydrochloric acid, and sulfuric acid, or bases, for example triethylamine, triethanolamine, trioctylamine, aqueous ammonia solution, lithium hydroxide, sodium hydroxide, potassium hydroxide, cesium hydroxide. Further additives include ethylene glycol, polyethylene glycol, 1,2-propanediol, 1,3-propanediol, polypropylene glycol, diethylene glycol monobutyl ether or glycerol. It is further possible to use dispersions or emulsions as further substances (e), examples being commercially available dispersions, for example styrene-butadiene latex, acrylic, vinyl, polyurethane or polyethylene dispersions and also emulsions of natural or synthetic oils, resins or waxes, for example carnauba wax, bees wax, wool wax, aloe vera, vitamin E, paraffin oil, unreactive silicone oil, unreactive silicone resin, jojoba oil, rice oil, calendula oil, tea tree oil, rose oil or balm oil emulsions. As further substances it is also possible to add commercially available preservatives for dispersions such as, for example, isothiazolinones or parabens, or aqueous formulations thereof.

The silane-containing polyvinyl alcohols/esters (b) can be mixed in the pure state, i.e., in substance, or as an aqueous solution with the ready-prepared organopolysiloxane dispersion (A), or be initially charged with the water (d) and optionally together with surface-active compounds (c) prior to the metered addition of silane (in the course of the preparation of the organopolysiloxane dispersion (A)).

Preference is given to using aqueous solutions of the silane-containing polyvinyl alcohols/esters (b), more preferably solutions of (b) in the concentration range from 1% to 30% by weight.

When the silane-containing polyvinyl alcohols/esters (b) are mixed with the ready-prepared organopolysiloxane dispersion (A), the latter is preferably initially charged in a temperature range from 10° to 95° C., more preferably at 50 to 90° C., and silane-containing polyvinyl alcohols/esters (b) are added by metered addition.

When the silane-containing polyvinyl alcohols/esters (b) are initially charged together with water (d) and optionally surface-active compounds (c) prior to the preparation of the organopolysiloxane dispersion (A), the organosilicon compounds to be dispersed are preferably metered in a temperature range from 1 to 95° C., more preferably in the range from 30 to 90° C.

When water-miscible additives (e) are used, the additives (e) can be added before, at the same time as, or after the mixing of the colloidal aqueous organopolysiloxane dispersion (A) with the component (b).

The binder-containing colloidal aqueous dispersion (B) of the present invention can be used for treating any desired fiber material of natural and synthetic origin. In principle, the slip resistance, the matte finish and/or the resistance to dry soiling is improved for all fiber materials.

The binder-containing colloidal aqueous dispersions (B) are preferably applied to the substrate and allowed to dry, preferably at a temperature in the range from 10 to 200° C.

Fiber materials subjected to the treatment with the binder-containing colloidal aqueous dispersion (B) of the present invention are for example those composed of wool, hair, jute, flax, cotton, regenerated cellulosic fibers, rayon, nylon, acrylates, polyacrylonitrile, polyvinylidene chloride, polyester, cellulose acetate, glass and blends or mixtures thereof. The dispersion can also be applied to leather or artificial leather.

The binder-containing colloidal aqueous dispersion (B) of the present invention can be applied to the fiber material in any desired manner. For instance, the fibers can be dipped into the dispersion or pulled through, or the dispersion can be applied to the fibers by spreading, brushing, sprinkling, foaming or spraying. Preference is given to foam application, pad-mangle application, kiss roll application and also application via the exhaust method.

For use, the colloidal aqueous dispersion of the present invention can be diluted with water in any proportion; preference is given to using concentrations in the range from 0.05 to 10.0 weight percent of organosilicon compounds all based on the weight of the dilute aqueous organopolysiloxane dispersion.

It is further possible to apply the colloidal aqueous dispersion (B) of the present invention formulated together with a cleaning agent. This is particularly useful for example for applying the dispersion to runners or carpets in residential areas or offices, since this provides—in one operation—not only for cleaning but also for an increase in the resistance to dry soiling.

It is generally advantageous for the use concentration of the dispersion to be such that the organopolysiloxanes therein end up on the fiber material in amounts of 0.5 to 15 g per m$^2$ of fiber material. Amounts ranging from 1 to 10 g per m$^2$ are particularly preferred.

After the binder-containing colloidal aqueous dispersion (B) of the present invention has been applied, the fiber material is dried. Drying can be carried out in any desired manner. The simplest method, for example, is to expose the treated fiber material to the air, and the water evaporates. However, drying can also be speeded by blowing air or other gases, more particularly heated gases, over the fiber material. However, drying can also be accomplished in an oven or infrared dryer. The drying conditions here each depend on the type, amount and density of the fiber materials. Short-pile polyamide carpets for example are advantageously dried at between 100 and 130° C. for 10 to 15 minutes.

PREPARATION EXAMPLES

Preparation of a methylsilsesquioxane hydrosol without Binder, Not According to the Invention Comparative Product 1:

1078 g of completely ion-free water, 1.7 g of potassium hydroxide (20% in methanol) and 20.8 g of N-alkyl(C12-18)-N,N-dimethyl-N-benzylammonium chloride (50% in water) are initially charged and heated to 50° C. Then, 294 g of trimethoxymethylsilane are metered with stirring at a rate of 30 grams per hour. After addition of about half the silane, a vacuum of 300 hPa is applied to remove released methanol. After silane addition, atmospheric pressure is set and 157 g of completely ion-free water are added. The mixture is heated to 90° C. and further distilled until a distillate quantity of 500 g is obtained. The product is cooled down to room temperature and filtered through a 75 μm polyamide filter fabric. The hydrosol is a slightly opalescent thin liquid having an average particle size of 41 nm.

Comparative Product 2:

1182 g of completely ion-free water and 11.3 g of 4-C10-13-sec-alkylbenzenesulfonic acid are initially charged and heated to 50° C. Then, 228 g of trimethoxymethylsilane are metered with stirring at a rate of 30 grams per hour. After addition of about half the silane, a vacuum of 300 hPa is applied to remove released methanol. After silane addition, atmospheric pressure is set and 770 g of completely ion-free water are added. The mixture is heated to 90° C. and further distilled until a distillate quantity of 350 g is obtained. The hydrosol is cooled down to 80° C. and adjusted with aqueous ammonia solution (25%) to pH 7. The product is cooled down to room temperature and filtered through a 75 μm polyamide filter fabric. The binder-containing hydrosol is a thin opalescent liquid having an average particle size of 79 nm.

Preparation of a methylsilsesquioxane hydrosol with Non-silane-containing polyvinyl alcohol, Not According to the Invention, Not Stable Comparative Product 3:

1078 g of completely ion-free water, 1.7 g of potassium hydroxide (20% in methanol), 20.8 g of N-alkyl-(C12-18)-N,N-dimethyl-N-benzylammonium chloride (50% in water) and 81 g of an aqueous polyvinyl alcohol solution (10%) (POLYVIOL® LL 2870, from Wacker Polymers) are initially charged and heated to 50° C. Then, 294 g of trimethoxymethylsilane are metered with stirring at a rate of 30 grams per hour. After addition of about half the silane, a vacuum of 300 hPa is applied to remove released methanol. After silane addition, atmospheric pressure is set and 157 g of completely ion-free water are added. The mixture is heated to 90° C. and further distilled. When about 150 g of distillate have been obtained, a firm gel forms, and this is impossible to process any further.

Preparation of a Nanoparticle-containing polyvinyl alcohol Via Free-radical Polymerization as Per Xin Jia et al., European Polymer Journal 43 (2007), Pages 1123-1131, Not According to the Invention Comparative Product 4:

Intermediate:

Functionalization of nanoparticles with vinyl groups. 5.0 g of colloidal silica (specific surface area 400 m$^2$/g; SiOH content 2 SiOH/nm$^2$) are stirred into 60 ml of methanol. This mixture is admixed with 10 ml of vinyltriethoxysilane and ultrasonically dispersed three times for 30 minutes at a time with slow stirring. Stirring is continued between the ultrasonications for 10 minutes each time. Thereafter, the dispersion is filtered through blue-ribbon paper. The filter residue is dried at 65° C. for 16 hours and then triturated in a mortar. The triturated powder is Soxhlet extracted with methanol for 10 hours to remove silane residues. Subsequently, the vinyl-containing silica is dried at 65° C. for 16 hours. The vinyl content of the silica is qualitatively verified via IR spectroscopy.

Free-Radical Polymerization:

3.2 g of the intermediate are mixed with 76.8 g of vinyl acetate and 50 ml of methanol and dispersed by ultrasonication for 30 minutes. Thereafter, the mixture is heated to 60-65° C. and admixed with 0.8 g of benzoyl peroxide to initiate the polymerization. The mixture is stirred at 60 to 65° C. for 4 hours. This is followed by dilution with 240 ml of methanol and the temperature being raised to 70-72° C. To saponify, 16 ml of aqueous sodium hydroxide solution (25%) are added. The precipitated polyvinyl alcohol is filtered off and dispersed into 400 ml of water. To complete the saponification, a further 16 ml of aqueous sodium hydroxide solution are added, followed by stirring of the mixture at 70 to 72° C. for 6 hours. Thereafter, the mixture is filtered to remove unattached silica fractions. The fully saponified polyvinyl alcohol is precipitated from the clear filtrate with about 400 ml of methanol. The solid is filtered off, washed with a little methanol and dried at 60° C. overnight. The silica content of the dried product is qualitatively verified via IR spectroscopy. The polymer is subsequently triturated in a mortar and further processed at 90° C. to form a clear yellowish 5% solution in water.

Preparation of a methylsilsesquioxane hydrosol with fluorocarbon-containing Binder, Not According to the Invention Comparative Product 5:

2.67 g of a 30% fluorocarbon dispersion (NUVA FB liquid, from Clariant) are mixed into 100 g of a methylsilsesquioxane hydrosol from comparative example 1. A stable thin milky white mixture is formed.

Preparation of the silane-containing polyvinyl alcohol as Per DE 10 2005 054 913 A1 (Binder, of Itself Not According to the Invention)

Comparative Product 6:

A thermostated laboratory apparatus having a capacity of 2.5 liters is initially charged with 1000 g of a 20% aqueous polyvinyl alcohol solution (Mowiol 8-88, from Kuraray Specialities Europe) under nitrogen, followed by heating to 90° C. with stirring. The initial charge is stirred at 90° C. for 2 h, before the temperature is lowered to 80° C. and 15 g of vinyltriethoxysilane (Geniosil GF 56, from Wacker Chemie) are added to the polyvinyl alcohol solution. After 15 min homogenization, the reaction is started by the addition of 10 g of a 3% aqueous potassium peroxodisulfate solution. The temperature is maintained at 80° C. for 4 h, before the batch is cooled down to give a clear polymer solution having a solids content of 21% by weight and having a 7.0% by weight silane fraction based on the total weight of the silane-modified polyvinyl alcohols.

Preparation of a methylsilsesquioxane hydrosol with silane-containing polyvinyl alcohol, According to the Invention

Example 1

1078 g of completely ion-free water, 1.7 g of potassium hydroxide (20% in methanol) and 20.8 g of N-alkyl(C12-18)-N,N-dimethyl-N-benzylammonium chloride (50% in water) are initially charged and heated to 50° C. Then, 294 g of trimethoxymethylsilane are metered with stirring at a rate of 30 grams per hour. After addition of about half the silane, a vacuum of 300 hPa is applied to remove released methanol. After silane addition, atmospheric pressure is set and 157 g of completely ion-free water are added. The mixture is heated to 90° C. and further distilled until a distillate quantity of 500 g is obtained. The hydrosol is cooled down to 80° C. Thereafter, 44 g of the binder prepared as per comparative example 6 are stirred in at a rate of 1 gram per minute. The product is cooled down to room temperature and filtered through a 75 μm polyamide filter fabric. The binder-containing hydrosol is a thin opalescent liquid having an average particle size of 97 nm.

Example 2

1078 g of completely ion-free water, 1.7 g of potassium hydroxide (20% in methanol) and 20.8 g of N-alkyl(C12-18)-N,N-dimethyl-N-benzylammonium chloride (50% in water) and 44 g of the binder prepared as per comparative example 6 are initially charged and heated to 50° C. Then, 294 g of trimethoxymethylsilane are metered with stirring at a rate of 30 grams per hour. After addition of about half the silane, a vacuum of 300 hPa is applied to remove released methanol. After silane addition, atmospheric pressure is set and 157 g of completely ion-free water are added. The mixture is heated to 90° C. and further distilled until a distillate quantity of 500 g is obtained. The product is cooled down to room temperature and filtered through a 75 µm polyamide filter fabric. The binder-containing hydrosol is a thin opalescent liquid having an average particle size of 110 nm.

Example 3

1182 g of completely ion-free water and 11.3 g of 4-C10-13-sec-alkylbenzenesulfonic acid are initially charged and heated to 50° C. Then, 228 g of trimethoxymethylsilane are metered with stirring at a rate of 30 grams per hour. After addition of about half the silane, a vacuum of 300 hPa is applied to remove released methanol. After silane addition, atmospheric pressure is set and 770 g of completely ion-free water are added. The mixture is heated to 90° C. and further distilled until a distillate quantity of 350 g is obtained. The hydrosol is cooled down to 80° C. and adjusted with aqueous ammonia solution (25%) to pH 7. Thereafter, 44 g of the binder prepared as per comparative example 6 are stirred in at a rate of 1 gram per minute. The product is cooled down to room temperature and filtered through a 75 µm polyamide filter fabric. The binder-containing hydrosol is a thin opalescent liquid having an average particle size of 90 nm.

Example 4

1182 g of completely ion-free water, 11.3 g of 4-C10-13-sec-alkylbenzenesulfonic acid and 44 g of the binder prepared as per comparative example 6 are initially charged and heated to 50° C. Then, 228 g of trimethoxymethylsilane are metered with stirring at a rate of 30 grams per hour. After addition of about half the silane, a vacuum of 300 hPa is applied to remove released methanol. After silane addition, atmospheric pressure is set and 770 g of completely ion-free water are added. The mixture is heated to 90° C. and further distilled until a distillate quantity of 350 g is obtained. The hydrosol is cooled down to 80° C. and adjusted with aqueous ammonia solution (25%) to pH 7. The product is then cooled down to room temperature and filtered through a 75 µm polyamide filter fabric. The binder-containing hydrosol is a thin opalescent liquid having an average particle size of 86 nm.

Example 5 and Comparative Tests a) Assessment of Adherence to and Film-forming Properties on a polyamide Sheet Products of examples 1 to 4 and comparative products 1, 2, 4, 5 and 6 are applied to a polyamide sheet (PA 6, thickness 80 µm) as a 50 µm thick layer using a box section blade coater. The films are dried and cured at 150° C. in a drying cabinet for 10 minutes. After cooling, the adherence and strength of the films is qualitatively assessed by rubbing the finger once firmly over the layer. The results of the film assessment are summarized in the table.

b) Assessment of Dry Soil Repellency on a polyamide Carpet

A piece of polyamide carpet 15×30 cm in size is dipped for 1 minute into, in each case, 600 milliliters of a liquor formed from 50 grams per liter of a dispersion of examples 1 to 4 and of comparative products 1, 2, 4, 5 and 6 and then squeezed off in a two-roll pad-mangle at 4 bar. Wet pickup is between 50 and 60%. Subsequently, the pieces of carpet are dried at 150° C. in a drying cabinet for 15 minutes and stored at 23° C. and 62% relative humidity in a conditioning chamber for 24 hours at least. One at a time of the pieces of carpet is placed in a plastic bag 30×40 cm in size together with 6.5 g of soot-containing test soil (wfk carpet pigment soil from wfk Testgewebe GmbH) and thoroughly shaken for 90 seconds. Thereafter, the carpet specimen is removed from the bag and the unattached portion of the soil is shaken off 3 times by hand in the laboratory fume hood. The carpet pieces are then measured for their degree of blackening using a CR-200 color-measuring instrument from Minolta. Each specimen is examined 9 times at different places. The measurement is carried out using the CIE D65 standard illuminant and the color system set to Yxy coordinates. The measure of blackening used is the Y value in %. The higher the Y value, the lighter the color of the specimen. For comparison, an untreated carpet specimen is soiled and measured for blackening. The soil repellency results are summarized in the table.

TABLE 1

| Carpet treated with | Film assessment on PA 6 sheet | Lightness Y in % |
|---|---|---|
| Example 1 | homogeneous, abrasion-resistant film | 53.68 ± 2.26 |
| Example 2 | homogeneous, abrasion-resistant film | 48.59 ± 3.53 |
| Example 3 | homogeneous, abrasion-resistant film | 38.53 ± 2.03 |
| Example 4 | homogeneous, abrasion-resistant film | 38.17 ± 3.20 |
| Comparative product 1 | brittle crystalline coating easily wiped off the polyamide sheet | 57.25 ± 2.50 |
| Comparative product 2 | Brittle crystalline coating easily wiped off the polyamide sheet | 26.73 ± 1.77 |
| Comparative product 4 | homogeneous, abrasion-resistant film | 25.11 ± 2.84 |
| Comparative product 5 | inhomogeneous coating easily rubbed off | 57.29 ± 1.87 |
| Comparative product 6, binder | homogeneous, abrasion-resistant film | 26.01 ± 1.90 |
| Untreated carpet specimen | — | 22.52 ± 1.90 |

The results in the table show that it is only with the inventive dispersions of examples 1-4 that a homogeneous, abrasion-resistant film is obtained as well as good soil repellency on carpets.

The binder according to the invention (silane-containing polyvinyl alcohol) alone as per comparative product 6 and the nanoparticle-containing polyvinyl alcohol as per comparative product 4 eventuate a homogeneous, abrasion-resistant film but no soil repellency. When the methylsilsesquioxane hydrosol is used without binder as per comparative products 1 and 2, the result obtained is not a homogeneous abrasion-resistant film but a brittle crystalline coating which is easily wiped off the polyamide sheet.

Similarly, the methylsilsesquioxane hydrosol with fluorocarbon-containing binder as per comparative product 5 gives an inhomogeneous, easily rubbed-off coating and not a homogeneous, abrasion-resistant film.

The use of polyvinyl alcohol as a binder as per comparative product 3 instead of the silane-containing polyvinyl alcohol according to the invention does not lead to a stable dispersion, but results in the formation of a firm gel, which cannot be used.

We claim:

1. Binder-containing colloidal aqueous dispersions, comprising:
   (a) organopolysiloxane(s) comprising units of the formula $$R^1_x Si(OR^2)_y O_{(4-x-y)/2} \quad (I)$$

where x is 0, 1, 2 or 3 and y is 0, 1 or 2,
   with the proviso that the sum total x+y is ≦3, x is on average from 1.0 to 2.0, and y is on average from 0 to 0.5,
   $R^1$ in each occurrence is the same or different and is an SiC-bonded monovalent hydrocarbyl radical having 1 to 18 carbon atoms per radical, optionally including water-inert substituents,
   $R^2$ in each occurrence is the same or different and is hydrogen or a hydrocarbyl radical having 1 to 18 carbon atoms per radical which may be interrupted by one or more non-adjacent oxygen atoms, or is a radical of the formula —$COCH_3$, —$COC_2H_5$ or —$CH_2CH_2OH$,
   (b) water-soluble or self-dispersing silane-containing polyvinyl alcohol(s) and/or polyvinyl esters and/or copolymers with the proviso that more than 50 mol % of fully or partially saponified vinyl ester units are present, wherein at least one of the monomer units contains an attached silane, and with the proviso that the silanes used in the preparation of (b) are those of the formula $$R^3 SiR^4_a (OR^5)_{3-a},$$

where a is 0, 1 or 2, $R^3$ is $CH_2$=$CR^6$—$(CH_2)_{0-3}$— or $CH_2$=$CR^6 CO_2 (CH_2)_{1-3}$—, $R^4$ is $C_1$- to $C_3$-alkyl, $C_1$-to $C_3$-alkoxy or halogen, $R^5$ is a branched or unbranched, optionally substituted alkyl radical having 1 to 12 carbon atoms or is an acyl radical having 2 to 12 carbon atoms, in which case $R^5$ is optionally interrupted by an ether group, and $R^6$ is H or $CH_3$,
   or those of the general formula $$CH_2=CR^7-CO-NR^8-R^9-SiR^{10}_m-(R^{11})_{3-m},$$

where m is 0 to 2, $R^7$ is either H or methyl, $R^8$ is H or an alkyl group having 1 to 5 carbon atoms, $R^9$ is an alkylene group having 1 to 5 carbon atoms or a bivalent organic group in which the carbon chain is interrupted by an oxygen or a nitrogen atom, $R^{10}$ is an alkyl group having 1 to 5 carbon atoms, $R^{11}$ is an alkoxy group having 1 to 40 carbon atoms, optionally substituted with further heteroatoms,
   (c) optionally surface-active compounds, and
   (d) water.

2. The binder-containing colloidal aqueous dispersion of claim 1, further comprising:
   (e) water-miscible additives selected from the group consisting of acids, ethylene glycol, polyethylene glycol, 1,2-propanediol, 1,3-propanediol, polypropylene glycol, diethylene glycol monobutyl ether or glycerol; dispersions and emulsions, preservatives, and mixtures thereof.

3. The binder-containing colloidal aqueous dispersions of claim 1, wherein the silane-containing polyvinyl alcohols (b) comprise silane-containing polyvinyl alcohols prepared by free-radical graft polymerization of vinyl alcohol polymers with ethylenically unsaturated silane-containing monomers.

4. The binder-containing colloidal aqueous dispersions of claim 1, wherein the silane-containing polyvinyl alcohols (b) comprise silane-containing polyvinyl alcohols prepared by free-radical polymerization of vinyl esters with ethylenically unsaturated silane-containing monomers and optionally further copolymerizable comonomers, followed by saponification of the resulting polymers.

5. The binder-containing colloidal aqueous dispersion of claim 2, wherein the acid is selected from the group consisting of formic acid, acetic acid, propionic acid, phosphoric acid, hydrochloric acid, sulphuric acid, and mixtures thereof.

6. The binder-containing colloidal aqueous dispersion of claim 2, wherein the base is selected from the group consisting of triethylamine, triethanolamine, trioctylamine, aqueous ammonia solution, lithium hydroxide, sodium hydroxide, potassium hydroxide, cesium hydroxide, and mixtures thereof.

7. The binder-containing colloidal aqueous dispersion of claim 2, wherein the dispersions and emulsions are selected from the group consisting of styrene-butadiene latex, acrylic, vinyl, polyurethane, and polyethylene dispersions, emulsions of natural and synthetic oils, resins and waxes, and mixtures thereof.

8. The binder-containing colloidal aqueous dispersion of claim 7, wherein natural and synthetic oils, resins, and waxes are selected from the group consisting of carnauba wax, beeswax, wool wax, aloe vera, vitamin E, paraffin oil, unreactive silicone oil, unreactive silicone resin, jojoba oil, rice oil, calendula oil, tea tree oil, rose oil, balm oil, and mixtures thereof.

9. A process for preparing a binder-containing colloidal aqueous dispersion of claim 2, comprising mixing components (a), (c), and (d) with component (b).

10. A process for treating substrates, comprising applying to the substrate a binder-containing aqueous dispersion of claim 1.

11. A process for treating substrates, comprising applying to the substrate a binder-containing aqueous dispersion prepared by the process of claim 9.

12. The process of claim 10, wherein the substrate is a fiber-containing substrate.

13. The process of claim 10, wherein the substrate is a textile floor covering.

14. The process of claim 13, wherein the textile floor covering comprises carpet.

15. The process of claim 11, wherein the substrate is a fiber-containing substrate.

16. The process of claim 11, wherein the substrate is a textile floor covering.

17. The process of claim 16, wherein the textile floor covering comprises carpet.

* * * * *